US012810110B2

(12) United States Patent
Casper

(10) Patent No.: US 12,810,110 B2
(45) Date of Patent: Nov. 24, 2026

(54) CHIP ARCHITECTURE FOR EFFICIENT RETRIEVAL OF NEURAL NETWORK WEIGHTS

(71) Applicant: Fortell Rearch Inc., New York, NY (US)

(72) Inventor: Andrew Casper, Eau Claire, WI (US)

(73) Assignee: Fortell Research Inc., New York, NY (US)

( * ) Notice: Subject to any disclaimer, the term of this patent is extended or adjusted under 35 U.S.C. 154(b) by 474 days.

(21) Appl. No.: 18/405,635

(22) Filed: Jan. 5, 2024

(65) Prior Publication Data

US 2025/0225365 A1 Jul. 10, 2025

(51) Int. Cl.
*G06F 13/28* (2006.01)
*G06N 3/04* (2023.01)

(52) U.S. Cl.
CPC .................................... *G06N 3/04* (2013.01)

(58) Field of Classification Search
CPC ......... G06N 3/04; G06N 3/0495; G06N 3/063
See application file for complete search history.

(56) References Cited

U.S. PATENT DOCUMENTS

| | | | | |
|---|---|---|---|---|
| 11,615,320 | B1 * | 3/2023 | Hung | G06F 16/2282 706/15 |
| 2021/0209450 | A1 * | 7/2021 | Cassidy | G06N 5/04 |
| 2022/0318604 | A1 * | 10/2022 | Xu | G06N 3/04 |

OTHER PUBLICATIONS

International Search Report and Written Opinion from International Application No. PCT/US25/10221 mailed Apr. 29, 2025, 10 pages.

* cited by examiner

*Primary Examiner* — Henry Tsai
*Assistant Examiner* — Kim T Huynh
(74) *Attorney, Agent, or Firm* — Shih IP Law Group, PLLC

(57) ABSTRACT

A neural network chip may include a weight memory configured to store multiple words, each word of the multiple words including a weight field configured to store multiple compressed neural network weights including all bits of M compressed neural network weights and some but not all bits of an (M+1)th compressed neural network weight, and an identifier field configured to store an identifier. A router may be configured to route a word of the multiple words from the weight memory to one of multiple queues based on the identifier in the identifier field of the word. A decompression engine may be configured to pop a compressed neural network weight at a head of a respective queue from the respective queue when compressed neural network weights at heads of all of the multiple queues are valid, and decompress the compressed neural network weight.

15 Claims, 20 Drawing Sheets

CHIP ARCHITECTURE FOR EFFICIENT RETRIEVAL OF NEURAL NETWORK WEIGHTS

BACKGROUND

The present disclosure relates to a neural network chip. Neural network chips may be used for running neural networks. Neural networks may be used, for example, in an car-worn device for speech enhancement and/or noise reduction.

SUMMARY

According to one aspect, a neural network chip includes a weight memory, routing and decompression circuitry including a router coupled to the weight memory, multiple queues coupled to the router, multiple decompression engines, and processing circuitry including multiple multiply-and-accumulate circuits (MACs). Each respective decompression engine of the multiple decompression engines is coupled between a respective queue of the multiple queues and a respective MAC of the multiple MACs. The weight memory is configured to store multiple words, each word of the multiple words including a weight field configured to store multiple compressed neural network weights including all bits of M compressed neural network weights and some but not all bits of an (M+1)th compressed neural network weight, and an identifier field configured to store an identifier. The router is configured to route a word of the multiple words from the weight memory to one of the multiple queues based on the identifier in the identifier field of the word. Each respective decompression engine is configured to pop a compressed neural network weight at a head of the respective queue from the respective queue when compressed neural network weights at heads of all of the multiple queues are valid, and decompress the compressed neural network weight popped from the respective queue to generate a decompressed neural network weight.

In some embodiments, the neural network chip includes multiple tiles, each tile including an instance of the weight memory, an instance of the routing and decompression circuitry, and an instance of the processing circuitry.

In some embodiments, the word of the multiple words includes a first word, the multiple words include a second word, the first word stores some but not all bits of a particular compressed neural network weight, and the second word includes remaining bits of the particular compressed neural network weight. In some embodiments, the first word and the second word are stored non-consecutively in the weight memory. In some embodiments, the multiple words include a third word, and the third word stores an integer number of compressed neural network weights. In some embodiments, the first word and the third word store different numbers of compressed neural network weights.

In some embodiments, each respective decompression engine is configured to determine whether the compressed neural network weight at the head of the respective queue is valid. In some embodiments, the compressed neural network weight includes a prefix indicating how many bits are in the compressed neural weight, and each respective decompression engine is configured to inspect the prefix and how many bits are in the respective queue to determine whether the compressed neural network weight at the head of the respective queue is valid. In some embodiments, each respective queue includes a ready/valid interface, the ready/valid interface including a ready signal and a valid signal; the valid signal for the ready/valid interface of a respective queue is based on whether the respective decompression engine determines that the compressed neural network weight at the head of the respective queue is valid; and the ready signal for the ready/valid interface of the respective queue is based on valid signals from ready/valid interfaces of all of the multiple queues. In some embodiments, the neural network chip further includes activation registers storing input activations, and the ready signal for the ready/valid interface of the respective queue is based on the valid signals from the ready/valid interfaces of all of the multiple queues and a valid signal for an element of the input activations.

In some embodiments, if the compressed neural network weights at the heads of all of the multiple queues are not all valid, then each respective decompression engine is configured to wait to pop the compressed neural network weight at the head of the respective queue from the respective queue until one or more further words are read from the weight memory and the compressed neural network weights at the heads of all of the multiple queues are valid.

In some embodiments, each respective decompression engine is further configured to transmit the decompressed neural network weight to the respective MAC. In some embodiments, the neural network chip further includes activation registers storing input activations, and the respective MAC is configured to multiply the decompressed weight by an input activation element received from the activation registers. In some embodiments, all of the multiple MACs are configured to use a same input activation element at a given time step.

In some embodiments, the multiple words are added to the weight memory by adding one word containing compressed neural network weights destined for each of the multiple queues to the weight memory, determining which queue of the multiple queues will run out of compressed neural network weights next, and adding a word containing compressed neural network destined for the queue of the multiple queues that will run out of compressed neural network weights next.

According to one aspect, a neural network chip includes a weight memory configured to store multiple words, each word of the multiple words including a weight field configured to store multiple compressed neural network weights including all bits of M compressed neural network weights and some but not all bits of an (M+1)th compressed neural network weight.

In some embodiments, the word of the multiple words includes a first word, the multiple words include a second word, the first word stores some but not all bits of a particular compressed neural network weight, and the second word includes remaining bits of the particular compressed neural network weight. In some embodiments, the first word and the second word are stored non-consecutively in the weight memory. In some embodiments, the multiple words include a third word, and the third word stores an integer number of compressed neural network weights. In some embodiments, the first word and the third word store different numbers of compressed neural network weights.

According to one aspect, a neural network chip includes a weight memory and processing circuitry including multiple multiply-and-accumulate circuits (MACs). The weight memory is configured to store multiple words, each word of the multiple words including a weight field configured to store multiple compressed neural network weights, and an identifier field configured to store an identifier controlling to which of the multiple MACs the multiple compressed neural network weights should be transmitted.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
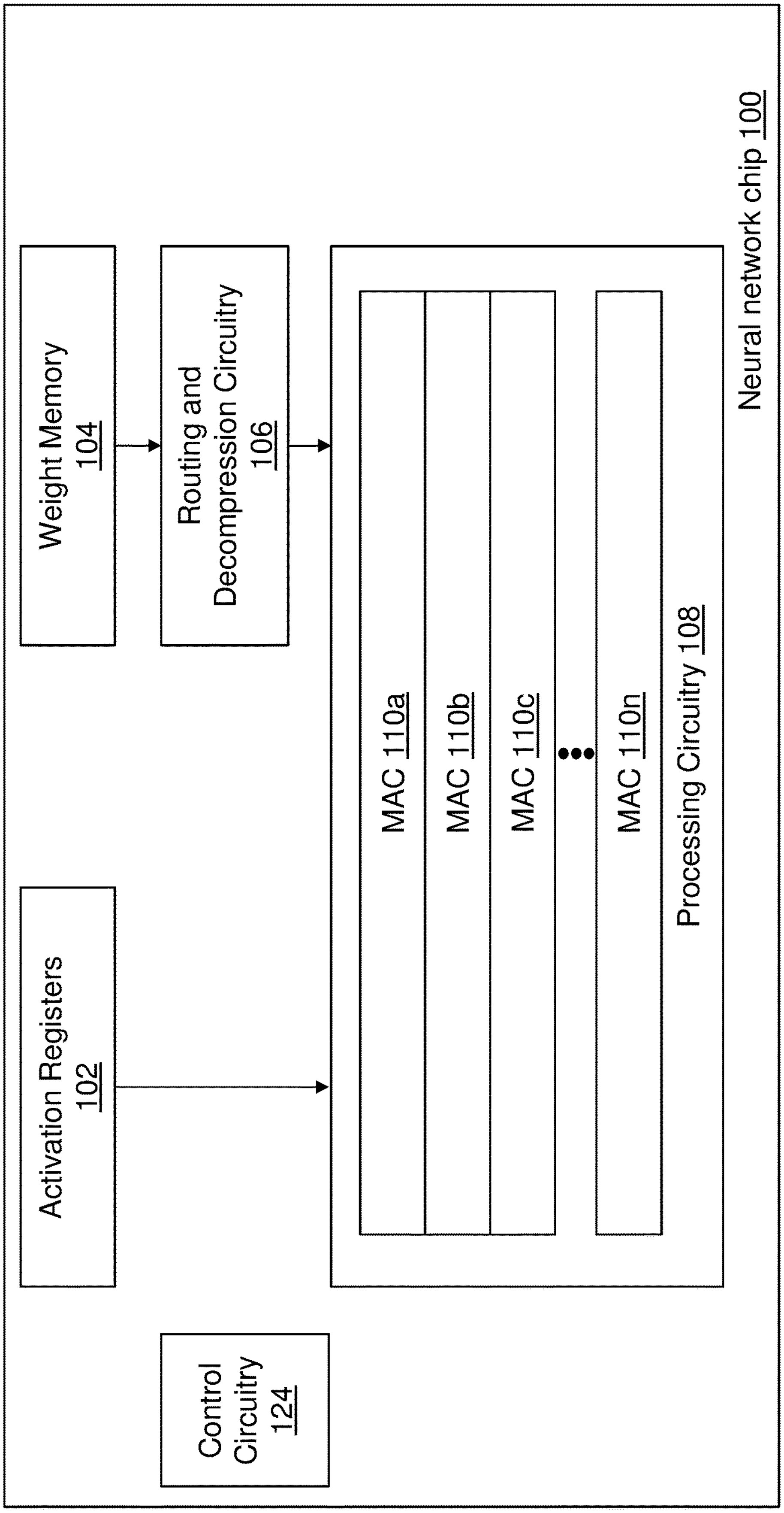
FIG. 1 illustrates a neural network chip, in accordance with certain embodiments described herein.

Neural network processing often involves processing a series of neural network weights. When neural network processing is performed on a chip (e.g., an application-specific integrated circuit (ASIC)), the weights may be stored in on-chip memory. One way to store these weights in memory is linearly. For example, if there are 256, 8-bit weights, the chip could use a single 8-bit wide by 256-word deep memory to store the weights. A downside of this approach is that it allocates a fixed amount of memory for these weights. If some of the weights could be compressed to less than 8-bits, it would not be possible to realize these savings in the area of the memory. That is, even if some weights could be compressed to 1 bit, for example, the weight would still be stored in a word that is 8 bits wide, which would realize no effective savings (e.g., in terms of the chip area occupied by the memory). In other words, when using compressed weights, there is a challenge of storing variable-width words in fixed-dimension memories.

The inventor has developed technology that addresses this challenge. Generally, the technology described herein may implement an efficient way to both store and retrieve neural network weights from a memory on a neural network chip, and thereby allow for a greatly reduced memory size and a low power decompression scheme. The technology may be particularly relevant for a streaming architecture which involves continuous processing of the same neural network.

In some embodiments, rather than storing a single compressed weight in a memory word, multiple compressed weights may be stored in a single memory word. Furthermore, each memory word may not need to store an integer number of compressed weights, but rather, a word may store M weights plus some of the bits for the (M+1)th weight. This storage scheme may allow for packing compressed weights in memory in a manner that consumes less memory if there is a high compression ratio. Compression ratio may refer to the ratio of uncompressed weight length to average compressed weight length, and the memory size savings may be approximately equal to the compression ratio.

In some embodiments, queues may be coupled at the output of the memory to allow for efficient deserialization of the compressed weights. The weights from a single word in memory may be loaded at once into a queue. Decompression engines at the head of each queue may stream out the compressed weights one compressed word at a time. A compressed weight may only be popped from the queue when a full weight (i.e., all bits of the weight) is present in every queue. That is, if a partial weight is at the head of a queue, the decompression engine may not pop it out, but may instead wait for the next word to be read from memory and added to the queue.

This scheme may allow for reads from memory to be decoupled from decompression. Compressed weights may be read from memory only when there is enough space to insert them into the queue. Compressed weights may only be popped from the queue when there are enough bits at the head to compose a fully compressed weight. When the weights have been stored with a high compression ratio, this scheme may greatly reduce the number of reads from memory as the decompression takes place at the head of the queue. Reads from memory may consume much higher power than pops from a queue so the power savings may be significant.

Some neural network processing scenarios may include multiple streams of weights to process a workload. While one could extend the technology described above such that each stream has its own memory with the storage scheme outlined above, there is a drawback, as the achievable compression ratio for a given stream may be significantly different than that of a different stream. For example, if there are four streams, the first three streams may have a very high compression ratio requiring little memory usage while the fourth may have a low compression ratio requiring significant memory usage. It may not be possible to know which streams will have high or low compression ratios. Thus, if each stream has an independent memory, each memory must be sized to the worst case compression ratio of any stream. This may result in many streams having oversized memories, which may result in wasted memory space.

Instead, the inventor has recognized that it may be helpful if multiple streams share a single memory, such that the memory can be sized to the average compression ratio of a collection of streams. This average may be much higher than the worst case compression ratio of a single stream. To accomplish this, the inventor has augmented the above scheme to not only store the compressed weights in a single word, but to include a tag with the compressed weights which indicates to which stream the weights belong. Then, a router may pass the memory word to the appropriate queue as determined by the tag. In this way, multiple streams may be stored efficiently in memory, as the allocation across streams is fungible.

One application of neural network chips is in ear-worn devices, such as hearing aids, cochlear implants, and earphones, which receive an input acoustic signal, amplify the signal, and output it to the wearer. Their performance can be improved by utilizing neural networks, for example to denoise audio signals. Deploying audio enhancement techniques may introduce delays between when a sound is emitted by the sound source and when the enhanced sound is output to a user. For example, such techniques may introduce a delay between when a speaker speaks and when a listener hears the enhanced speech. During in-person communication, long latencies can create the perception of an echo as both the original sound and the enhanced version of the sound are played back to the listener. Additionally, long latencies can interfere with how the listener processes incoming sound due to the disconnect between visual cues (e.g., moving lips) and the arrival of the associated sound.

The inventors have recognized that, to attain tolerable latencies when implementing a neural network on an car-worn device, the car-worn device would need to be capable of performing billions of operations per second. To address power issues with such demanding requirements, the neural network may be implemented on a neural network chip in the car-worn device. Further description may be found in U.S. patent application Ser. No. 18/232,854, titled NEURAL NETWORK CHIP FOR EAR-WORN DEVICE, and filed on Aug. 11, 2023, which is incorporated by reference herein in its entirety. The technology described herein, which may enable storage of a large number of neural network weights on a small chip without using external memory and in a way that uses very low power, may be helpful in such applications. However, it should be appreciated that the technology described herein may be used in other applications as well.

The aspects and embodiments described above, as well as additional aspects and embodiments, are described further below. These aspects and/or embodiments may be used individually, all together, or in any combination of two or more, as the disclosure is not limited in this respect.

FIG. 1 illustrates a neural network chip 100, in accordance with certain embodiments described herein. The neural network chip 100 includes activation registers 102, weight memory 104, routing and decompression circuitry 106, processing circuitry 108, and control circuitry 124. The processing circuitry 108 includes multiple multiply-and-accumulate circuits (MACs) 110*a*-110*n*. It should be appreciated that the neural network chip 100 may include more elements than illustrated. The activation registers 102 are coupled to the processing circuitry 108. The weight memory 104 is coupled to the routing and decompression circuitry 106, which is coupled to the processing circuitry 108. The activation registers 102 may be configured to store input activations and the weight memory 104 may be configured to store compressed neural network weights. The control circuitry 124 may be configured to control operation of the neural network chip 100.

In operation, on a given time step, the activation registers 102 may be configured to transmit an element of an input activation to the processing circuitry 108. Each MAC 110 in the processing circuitry 108 may be configured to receive the input activation element. The weight memory 104 may be configured to transmit multiple compressed neural network weights to the routing and decompression circuitry 106. The routing and decompression circuitry 106 may be configured to decompress the compressed neural network weights and route them to the appropriate MACs 110 in the processing circuitry 108. The MACs 110 may be configured to multiply an element of an activation vector by a decompressed neural network weight and accumulate the result with a result from a previous time step. Some, or all, of these operations may be performed under the control of the control circuitry 124.

In some embodiments, the neural network chip 100 may include multiple tiles, and each tile may include an instance of the activation registers 102, an instance of the weight memory 104, an instance of the routing and decompression circuitry 106, and an instance of the processing circuitry 108.

Figure 2:
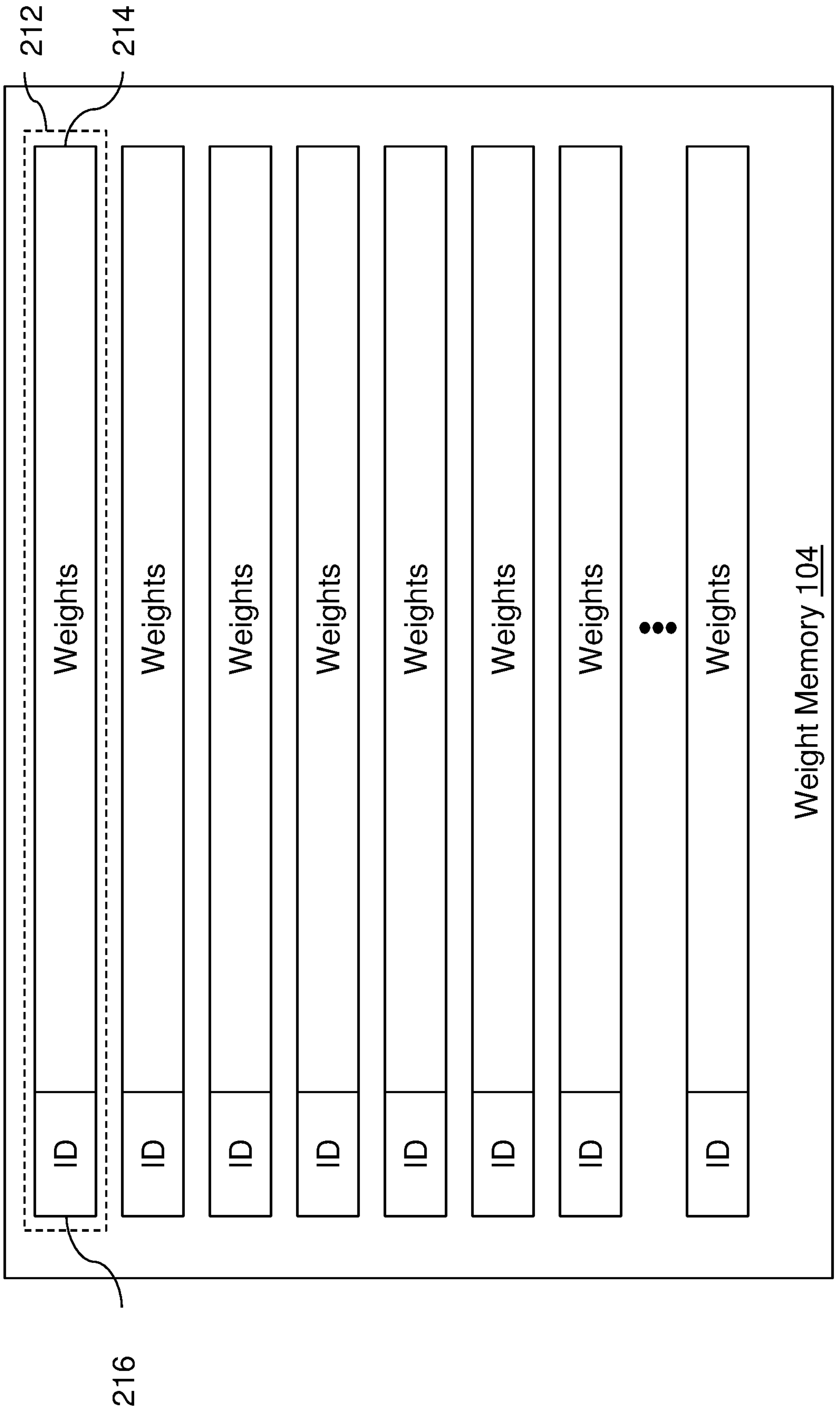
FIG. 2 illustrates words that may be stored in weight memory, in accordance with certain embodiments described herein.

FIG. 2 illustrates words 212 that may be stored in the weight memory 104, in accordance with certain embodiments described herein. The weight memory 104 may be configured to store multiple words 212. A word 212 may be a set of data that is read from the weight memory 104 at the same time. As illustrated, each word 212 contains a weight field 214 and an identifier (ID) field 216. The weight field 214 in the word 212 may be configured to store multiple compressed neural network weights. Each compressed neural network weight may include multiple bits. In some embodiments, the weight field 214 of a word 212 may not store an integer number of compressed weights. In other words, compressed neural network weights in the weight field 214 of a word 212 may include all bits of M compressed neural network weights and some but not all bits of the (M+1)th compressed neural network weight. M need not necessarily be the same from word 212 to word 212. Thus, a first word 212 in the weight memory 104 may store some but not all bits of a particular compressed neural network weight, and a second word 212 in the weight memory 104 may store remaining bits of the particular compressed neural network weight. Additionally, the first word 212 and the second word 212 need not necessarily be stored consecutively in the weight memory 104. For example, the address of the first word 212 and the address of the second word 212 may be non-consecutive. An example of a method for allocating neural network weights to different words 212 that may result in parts of a neural network weight being stored in non-consecutive words 212 may be found with reference to FIG. 5.

It should be appreciated that while each word 212 in the weight memory 104 may be capable of storing a non-integer number of compressed neural network weights, not every word 212 needs to store a non-integer number of compressed neural network weights. Thus, a word 212 may contain part, but not all, of one or more neural network weights. At a given time, some of the words 212 in the weight memory 104 may store an integer number of compressed neural network weights and some of the words 212 in the weight memory 104 may store a non-integer number of compressed neural network weights. It should also be appreciated that some of the words 212 in the weight memory 104 may store zero neural network weights. It should also be appreciated that each word 212 may store a different number of compressed neural network weights.

The identifier field 216 of a word 212 may be configured to store an identifier. The identifier may control to which of the queues 320*a*-320*n* (illustrated in FIG. 3), and thereby which of the MACs 110-110*n*, the neural network weights in the weight field 214 of the word 212 should be transmitted for use in neural network processing by that particular MAC 110. As will be described further below, the words 212 may be stored in the weight memory 104 in a particular order.

Figure 3:
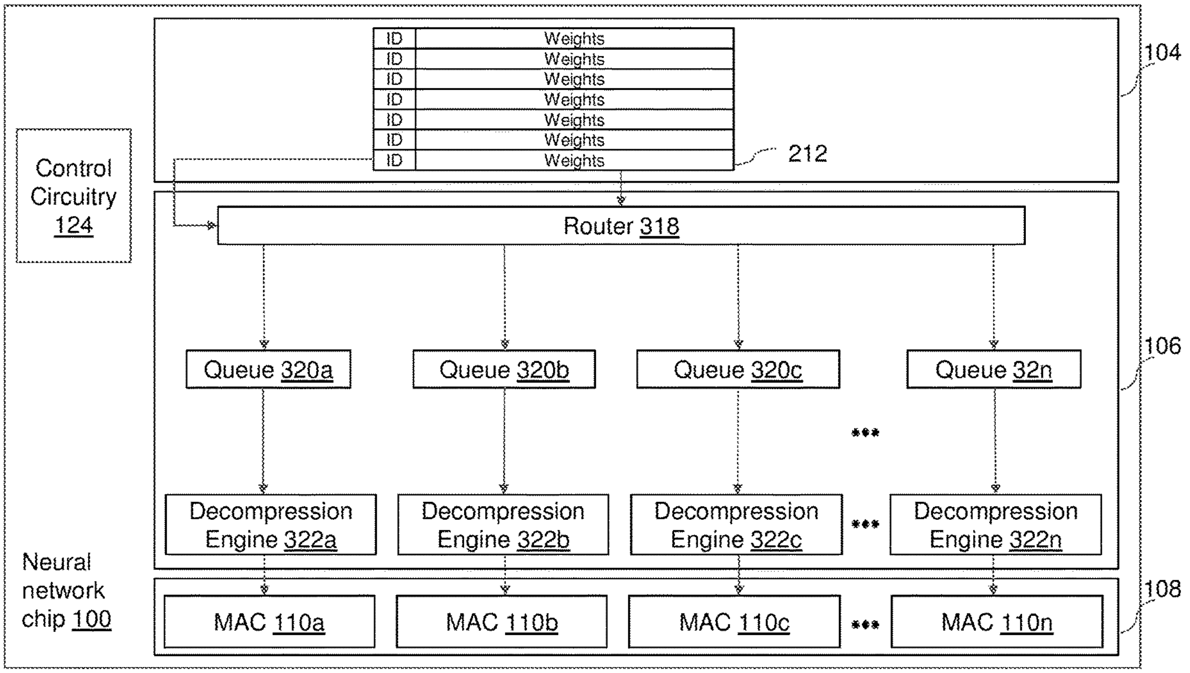
FIG. 3 illustrates weight memory, routing and decompression circuitry, processing circuitry, and control circuitry in more detail, in accordance with certain embodiments described herein.

FIG. 3 illustrates the weight memory 104, the routing and decompression circuitry 106, the processing circuitry 108, and the control circuitry 124 in more detail, in accordance with certain embodiments described herein. The weight memory 104 stores the words 212. The routing and decompression circuitry 106 includes a router 318, multiple queues 320*a*-320*n*, and multiple decompression engines 322*a*-322*n*. The processing circuitry 108 includes the MACs 110*a*-110*n* as described above. The router 318 is coupled to the weight memory 104. The queues 320*a*-320*n* are coupled to the router 318. Each of the queues 320*a*-320*n* is coupled to a respective one of the decompression engines 322*a*-322*n*. Each of the decompression engines 322*a*-322*n* is coupled to a respective one of the MACs 110*a*-110*n*. Thus, each of the respective decompression engines 322 of the multiple decompression engines 322*a*-322*n* is coupled between a respective queue 320 of the multiple queues 320*a*-320*n* and a respective MAC 110 of the multiple MACs 110*a*-110*n*.

In operation, the router 318 may be configured to route a word 212 of the multiple words 212 from the weight memory 104 to one of the queues 320*a*-320*n* based on the identifier in the identifier field 216 of the word 212. For example, a word 212 with an ID of 0 may cause the router 318 to route the weights in the word 212 to the queue 320*a*, a word 212 with an ID of 1 may cause the router 318 to route the weights in the word 212 to the queue 320*b*, etc. The router 318 may be configured to route successive words 212, one by one, from the weight memory 104 to one of the queues 320*a*-320*n*. The router 318 may be configured not to route a word 212 from the weight memory 104 to a destination queue 320 if that queue 320 does not have sufficient space for the entire word 212 to fit in the queue 320. The control circuitry 124 may be configured to increment the address of the current word 212 each time a word 212 is read out.

A decompression engine 322 sits at the head of each queue 320. Compressed neural network weights may be independently decompressed by the decompression engines 322 across all queues 320. Each respective decompression engine 322 may be configured to pop the compressed neural network weight at the head of its respective queue 320 from the respective queue 320 when the compressed neural networks weight at the heads of all of the queues 320*a*-320*n* are valid (i.e., all bits of at least one compressed weight are in the queue 320). If the compressed neural network weights at the heads of all of the queues 320 are not all valid, then each respective decompression engine 322 may be configured to wait to pop the compressed neural network weight at the head of the respective queue 320 from the respective queue 320 until one or more further words 212 are read from the weight memory 104, and the compressed neural network weights at the heads of all of the multiple queues 320 are valid.

Figure 4:
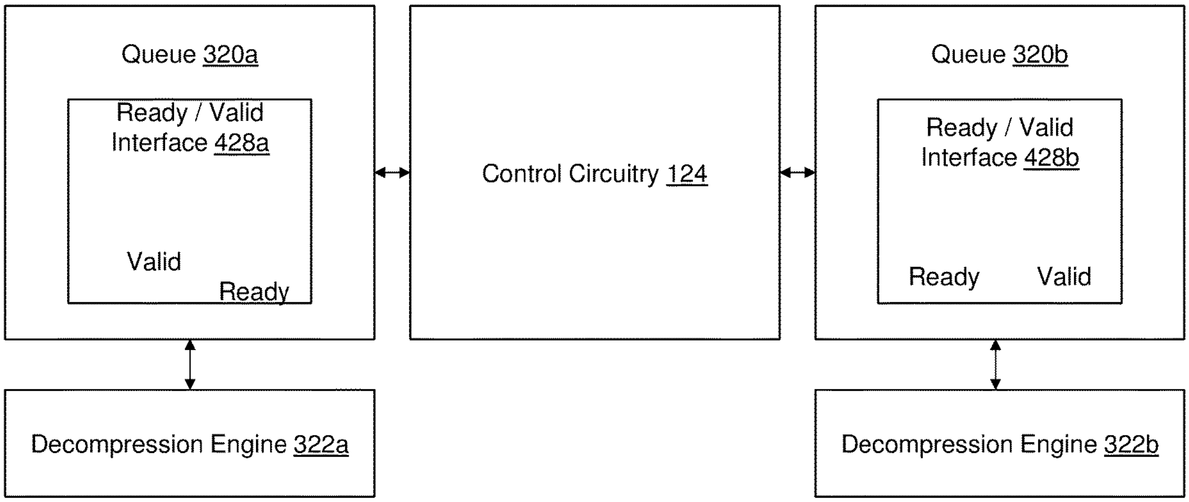
FIG. 4 illustrates ready/valid interfaces in each queue, in accordance with certain embodiments described herein.

FIG. 4 illustrates ready/valid interfaces 428 in each queue 320, in accordance with certain embodiments described herein. Each respective queue 320 may include a ready/valid interface 428. Each ready/valid interface 428 may include a valid signal and a ready signal. While only two queues 320*a* and 320*b* are illustrated, it should be appreciated that all the queues 320*a*-320*n* may include ready/valid interfaces 428 and they all may be coupled to the control circuitry 124. Each respective decompression engine 322 may be configured to determine whether the compressed neural network weight at the head of its respective queue 320 is valid. In some embodiments, each decompression engine 322 may be configured to inspect the respective queue 320 to determine whether there is a valid compressed neural network weight at its head. In some embodiments, the decompression engine 322 may be configured to determine whether there is a valid compressed neural network weight at the head of a queue 320 by determining whether all bits of a compressed neural network weight are at the head of the queue 320. In some embodiments, each compressed neural network weight may include a prefix indicating how many bits are in the compressed neural network weight. In such embodiments, each respective decompression engine 322 may be configured to inspect (1) the prefix at the head of its respective queue 320 and (2) how many bits are in the respective queue 320, to determine whether the compressed neural network weight at the head of the respective queue 320 is valid. For example, if the prefix at the head of the queue 320 indicates that the compressed neural network weight should have 8 bits, and there are 8 or more bits in the queue 320 after the prefix, then the decompression engine 322 may determine that the compressed neural network weight is valid. If there are fewer than 8 bits in the queue 320 after the prefix, then the decompression engine 322 may determine that the compressed neural network weight is not valid.

The valid signal for the ready/valid interface 428 of a queue 320 may be based on whether the respective decompression engine 322 determines that the compressed neural network weight at the head of the queue 320 is valid. For example, if the decompression engine 322 determines that the compressed neural network weight at the head of the queue 320 is valid, then the valid signal may be set to 1, and if the decompression engine 322 determines that the compressed neural network weight at the head of the queue 320 is not valid, then the valid signal may be set to 0. The ready signal for the ready/valid interface 428 of a queue 320 may be based on valid signals from ready/valid interfaces 428 of all the queues 320. In some embodiments, the control circuitry 124 may be configured to receive the valid signals from all the queues 320, perform an AND operation on all the valid signals, and transmit the result back to each of the ready/interfaces 428 as the ready signal. Thus, the ready signal may indicate whether all queues 320 have valid compressed neural network weights at their heads. For example, if all queues 320 have valid compressed neural network weights at their heads, the ready signal may be 1, and if not all queues 320 have valid compressed neural network weights at their heads, the ready signal may be 0. A decompression engine 322 may be configured to pop a compressed neural network weight from the respective queue 320 only if the ready signal from its ready/valid interface 428 is 1. In some embodiments, the ready signal for the ready/valid interface 428 of a queue 320 may be based on valid signals from ready/valid interfaces 428 of all the queues 320 and a valid signal for a current element of the input activations (i.e., from the activation registers 102). The valid signal for the current activation input element may be generated by the control circuitry 124 when the input activation element has been retrieved from the activation registers 102 and is ready for multiplication with the neural network weights. In such embodiments, the control circuitry 124 may be configured to perform the AND operation on all the valid signals and the valid signal for the current element of the input activation. If the compressed neural network weight at the heads or one or more queues 320 are not valid, which may be indicated by the ready signal, then each decompression engine 322 may be configured to wait to pop a next compressed neural network weight from the respective queue 320 until one or more further words 212 are read from the weight memory 104 and the compressed neural network weights at the heads of all queues 320 become valid.

Each decompression engine 322 may be further configured to decompress the compressed neural network weight that it popped from its respective queue 320 to generate a decompressed neural network weight. Further description of various methods for compressing and decompressing neural network weights may be found in Sharma, Gajendra. "Analysis of Huffman Coding and Lempel-Ziv-Welch (LZW) Coding as Data Compression Techniques." International Journal of Scientific Research in Computer Science and Engineering 8.1 (2020): 37-44, which is incorporated by reference herein in its entirety. Each decompression engine 322 may be further configured to transmit the decompressed neural network weight to the respective MAC 110. Each respective MAC 110 may be configured to multiply the decompressed neural network weight received from the corresponding decompression engine 322 by an input activation element received from the activation registers 102. In some embodiments, all of the MACs 110*a*-110*n* are configured to use the same input activation element at a given time step. Thus, the weight in each queue 320 must be valid before any of the weights can be popped out of the queues 320 and proceed to decompression and multiplication.

Figure 5:
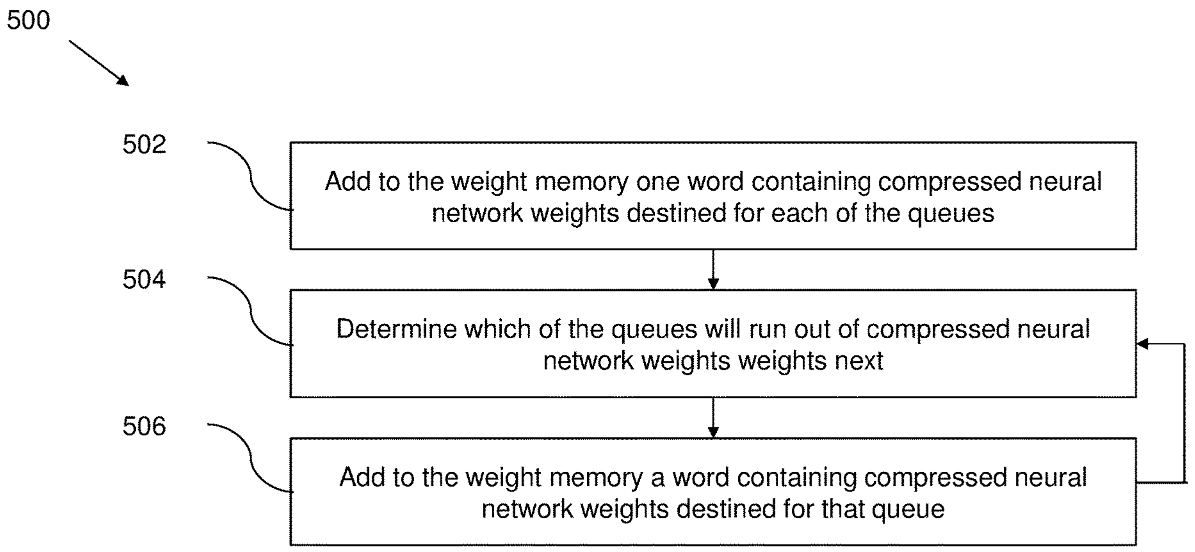
FIG. 5 illustrates an example process for adding words into weight memory, in accordance with certain embodiments described herein.
Figure 6A:
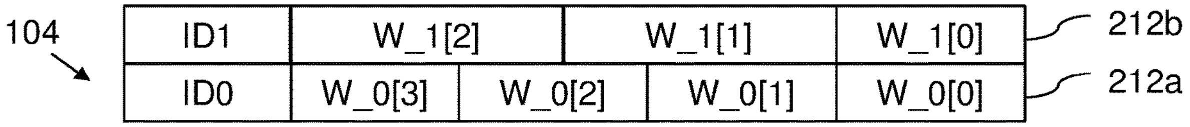
FIGS. 6A-6C illustrate an example of adding words into the weight memory for illustrating the process of FIG. 5, in accordance with certain embodiments described herein.
Figure 6B:
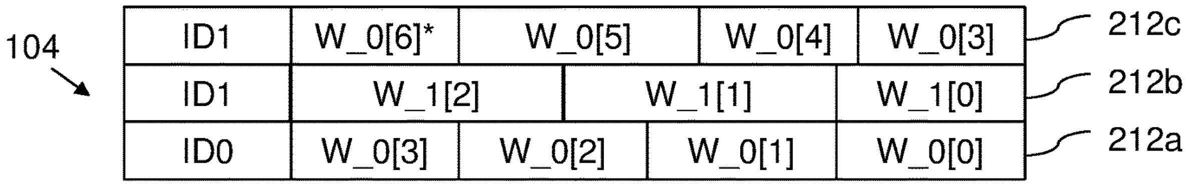
Figure 6C:
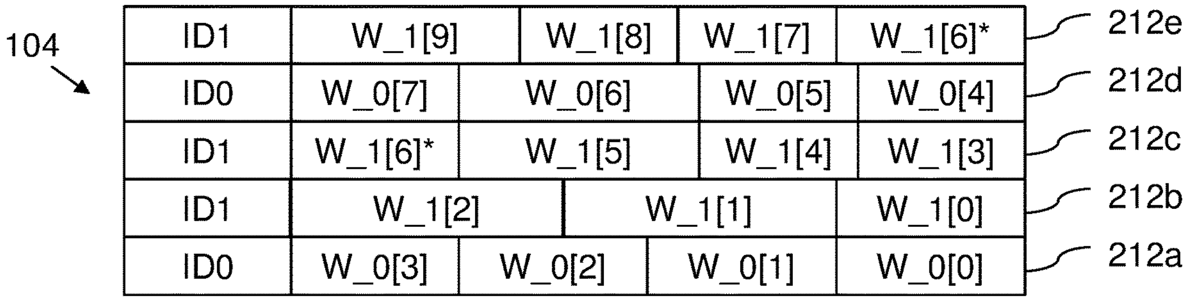

As described above, each decompression engine 322 may be configured to pop out the weight at the head of its corresponding queue 320 when all the weights at the heads of all the queues 320 are valid. Therefore, there may be efficient methods for adding words destined for different queues 320 (and, by extension, different MACs 110) into the weight memory 104. FIG. 5 illustrates an example process 500 for adding words 212 into the weight memory 104, in accordance with certain embodiments described herein. FIGS. 6A-6C illustrate an example of adding words into the weight memory 104 for illustrating the process 500, in accordance with certain embodiments described herein.

At step 502, one word 212 containing compressed neural network weights destined for each of the queues 320 is added to the weight memory 104. For example, if there are two queues 320*a* and 320*b*, at step 502 two words 212 may be added to the weight memory 104, one word destined for the queue 320*a* and one word destined for the queue 320*b*.

Referring to FIG. 6A, FIG. 6A illustrates two words 212*a* and 212*b* that are initially added to the weight memory 104 at step 502. In the notation W_N[X] for a given weight, N is the queue 320 (and by extension, the MAC 110) for which the weight is destined, X is the number of the weight, and * means a partial weight. The identifier field 216 of the word 212*a* indicates that the word 212*a* is destined for a queue 320 corresponding to the identifier “ID0”; this queue 320 will be referred to as “Queue 0.” The identifier field 216 of the word 212*b* indicates that the word 212*a* is destined for a queue 320 corresponding to the identifier “ID1”; this queue 320 will be referred to as “Queue 1.”

Referring back to FIG. 5, at step 504, it is determined which of the queues 320 will run out of compressed neural network weights (i.e., full weights) next. Referring to the example of FIG. 6A, once the word 212*a* is read into Queue 0 and the word 212*b* is read into Queue 1, then W_0[0] and W_1[0] will be popped out the respective queues, followed by W_0[1] and W_1[1], and followed by W_0[2] and W_1[2]. At this point, Queue 1 will have run out of weights before Queue 0.

Referring back to FIG. 5, at step 506, a word containing compressed neural network weights destined for the queue 320 determined at step 504 is added to the weight memory 104, and the process returns to step 504 again. Referring to FIG. 6B, another word 212*c* destined for Queue 1 has been added to the weight memory 104.

FIG. 6C illustrates an example of the weight memory 104 after two more iterations through steps 504 and 506. As illustrated, the weight W_1[6] is partially stored in the word 212*c* and partially stored in the word 212*e*. It should also be appreciated that the weights W_0[6] and W_1[6] will be popped from their respective queues only once the full weight W_1[6] is in the Queue 1, in other words, once the word 212*e* has been read into Queue 1.

It should be appreciated from FIG. 6*c* that a first word 212 in the weight memory 104 may store some but not all bits of a particular neural network weight, and a second word 212 in the weight memory 104 may store remaining bits of the particular neural network weight. Additionally, the first word 212 and the second word 212 need not necessarily be stored consecutively in the weight memory 104. For example, the word 212*c* stores some but not all bits of the weight W_1[6], and the word 212*e* stores the remaining bits of the weight W_1[6]. Additionally, the word 212*c* and the word 212*e* are not stored consecutively in the weight memory 104.

It should also be appreciated from FIG. 6C that some words 212 in the weight memory 104 may store a non-integer number of compressed neural network weights (e.g., the words 212*c* and 212*e*) while some words 212 in the weight memory 104 may store an integer number of compressed neural network weights (e.g., the words 212*a*, 212*b*, and 212*d*).

It should also be appreciated from FIG. 6C that words 212 in the weight memory 104 may store different numbers of compressed neural network weights. For example, the word 212*b* stores three weights, the words 212*a* and 212*d* store four weights, and the words 212*c* and 212*e* store three weights plus a partial fourth weight.

Figure 7:
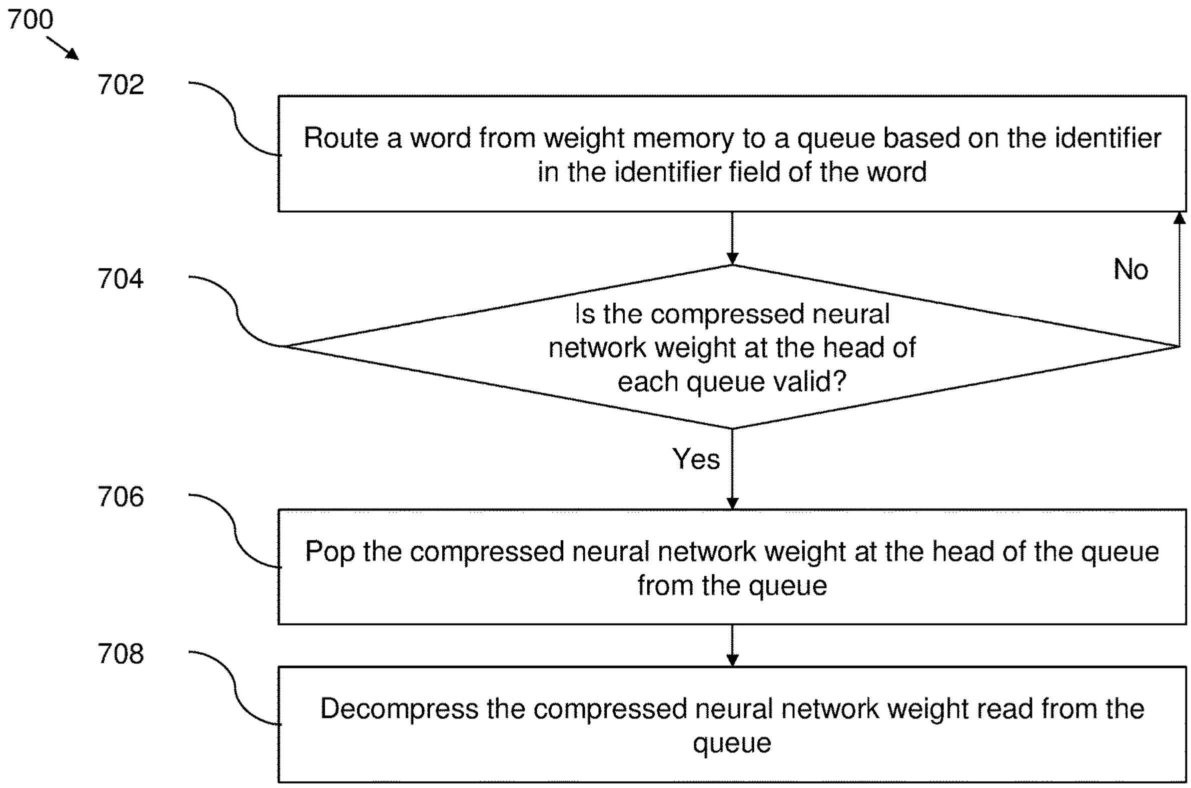
FIG. 7 illustrates a process for operating a neural network chip, in accordance with certain embodiments described herein.

FIG. 7 illustrates a process 700 for operating the neural network chip 100, in accordance with certain embodiments described herein.

At step 702, the router 318 routes a word 212 from the weight memory 104 to a queue 320 based on the identifier in the identifier field 216 of the word 212.

At step 704, the decompression engine 322 determines whether the compressed weight at the head of each queue 320 in the neural network chip 100 is valid. Further information about how a decompression engine 322 may use a ready/valid interface 428 to make this determination may be found with reference to FIG. 4. If the compressed neural network weight at the head of each queue 320 is not valid (i.e., at least one queue 320 has an invalid compressed weight at its head, e.g., a partial weight at its head, or no weights at all in the queue 320) then the process 700 proceeds back to step 702. Multiple loops through step 702 and step 704 may be necessary, and multiple words 212 may need to be read into multiple queues 320, until the condition at step 704 is satisfied. If the compressed weight at the head of each queue 320 is valid, the process 700 proceeds to step 706.

At step 706, each decompression engine 322 pops the compressed neural network weight at the head of its respective queue 320 from the respective queue 320.

At step 708, each decompression engine 322 decompresses the compressed neural network weight popped from its corresponding queue 320.

FIGS. 8A-8M illustrate an example of operation according to the process 700, in accordance with certain embodiments described herein. The example is a simplified example with just two queues 320*a* and 320*b* and two decompression engines 322*a* and 322*b*. The example uses the memory words 212*a*-212*e* from FIGS. 6A-6C. FIGS. 8A-8M illustrate the memory address counter as an arrow 826 pointing to the word 212 at the current address.

Figure 8A:
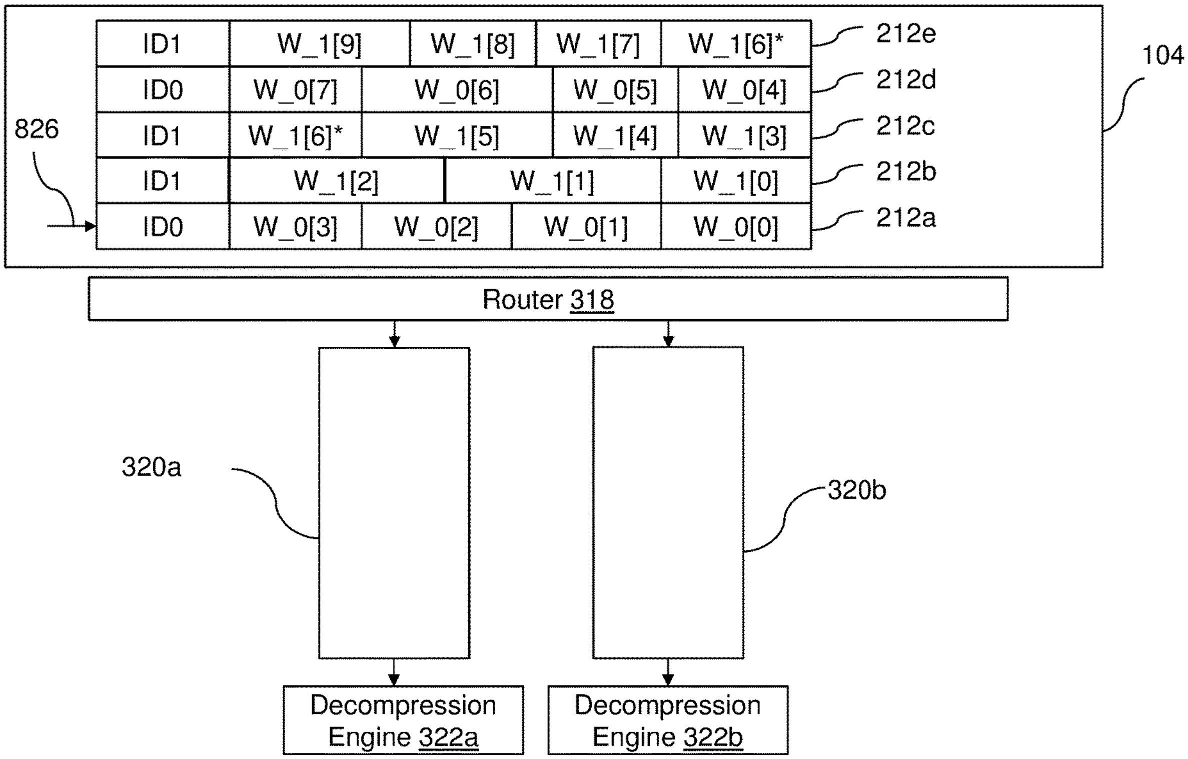
FIGS. 8A-8M illustrate an example of operation according to the process of FIG. 7, in accordance with certain embodiments described herein.

In FIG. 8A, the two queues 320*a* and 320*b* are empty.

Figure 8B:
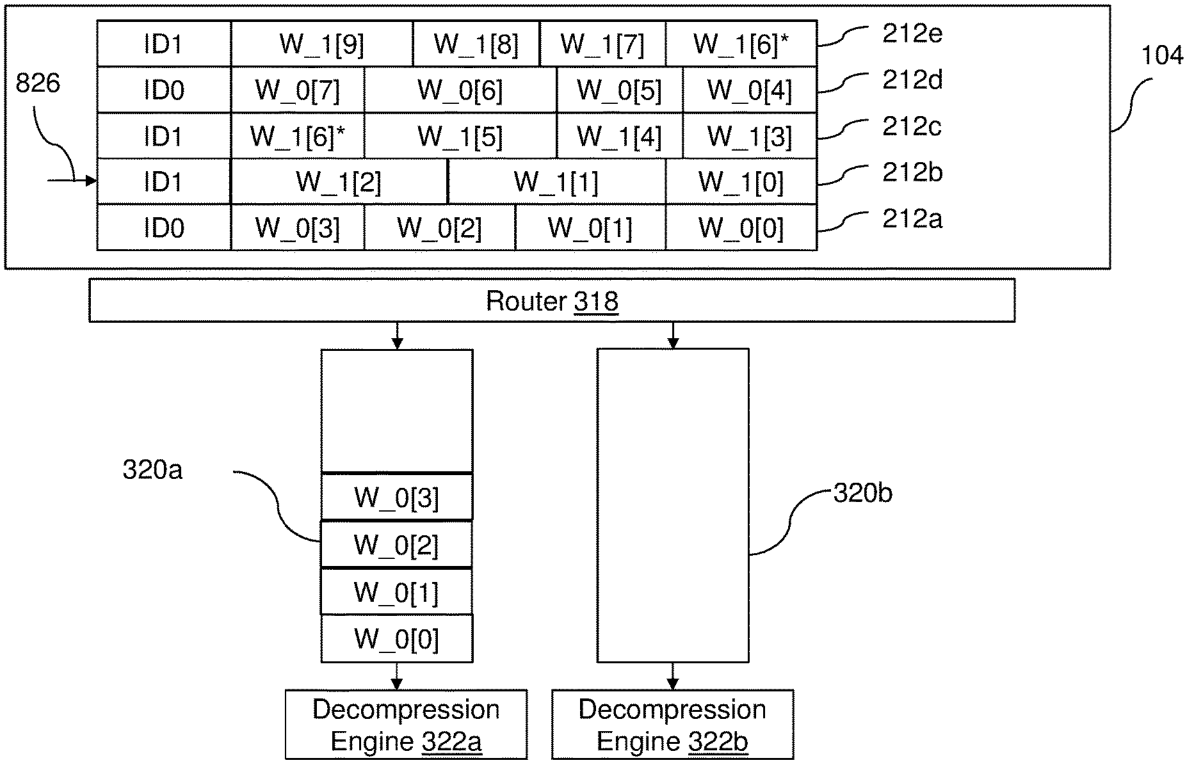

In FIG. 8B, the router 318 routes the word 212*a* to the queue 320*a* (based on the identifier in the word 212*a*) and increments the memory address counter 826. Because there are no weights at all in the queue 320*b*, the compressed neural network weight at the head of each of the queues 320*a* and 320*b* is not valid.

Figure 8C:
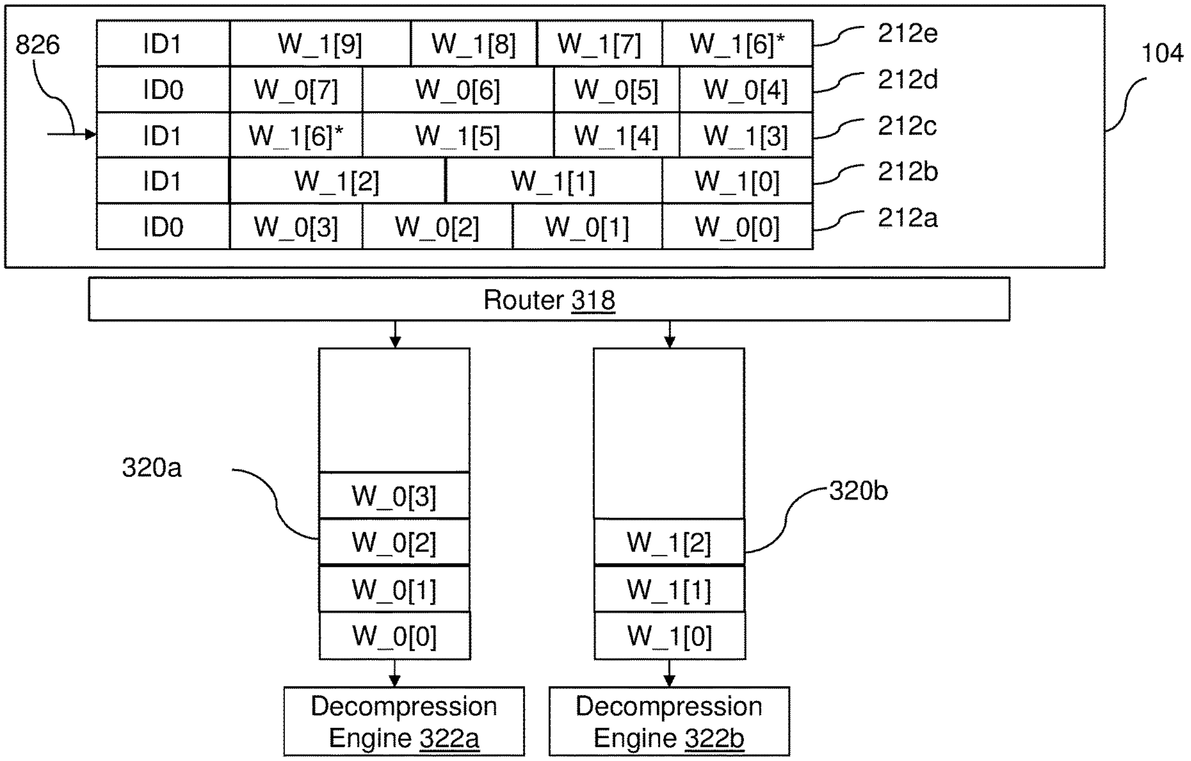
Figure 8D:
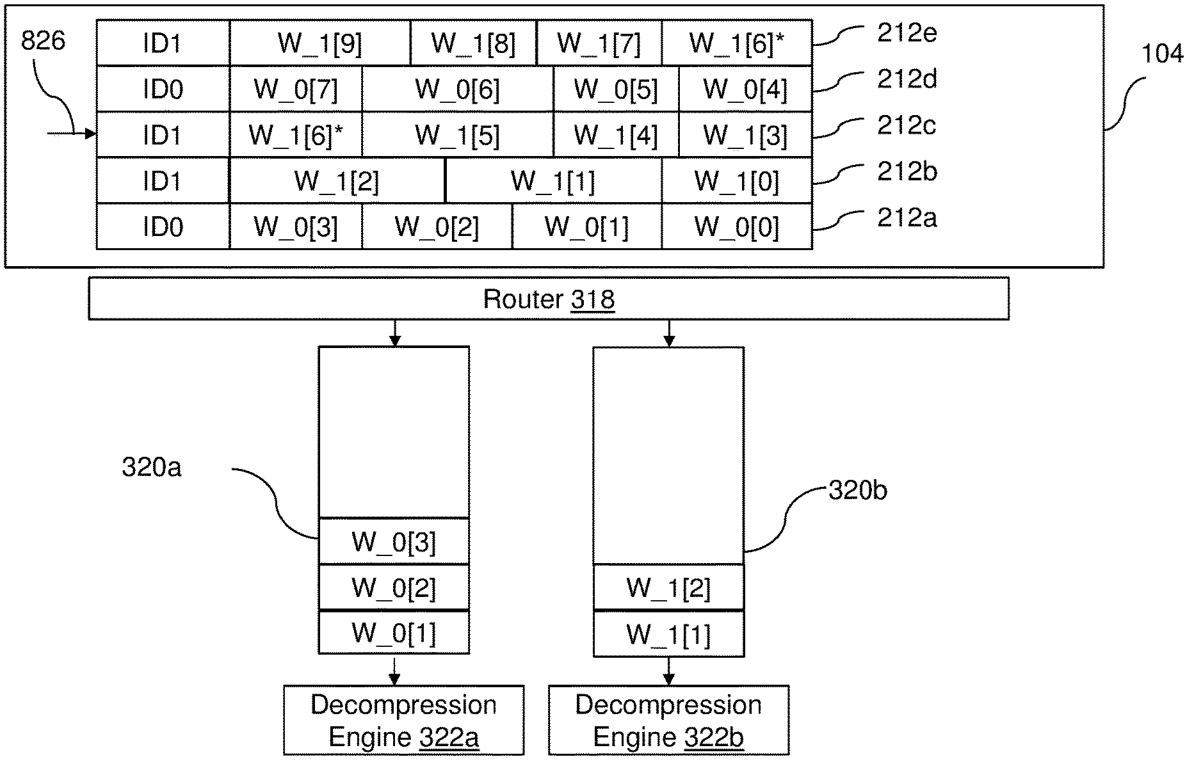
Figure 8E:
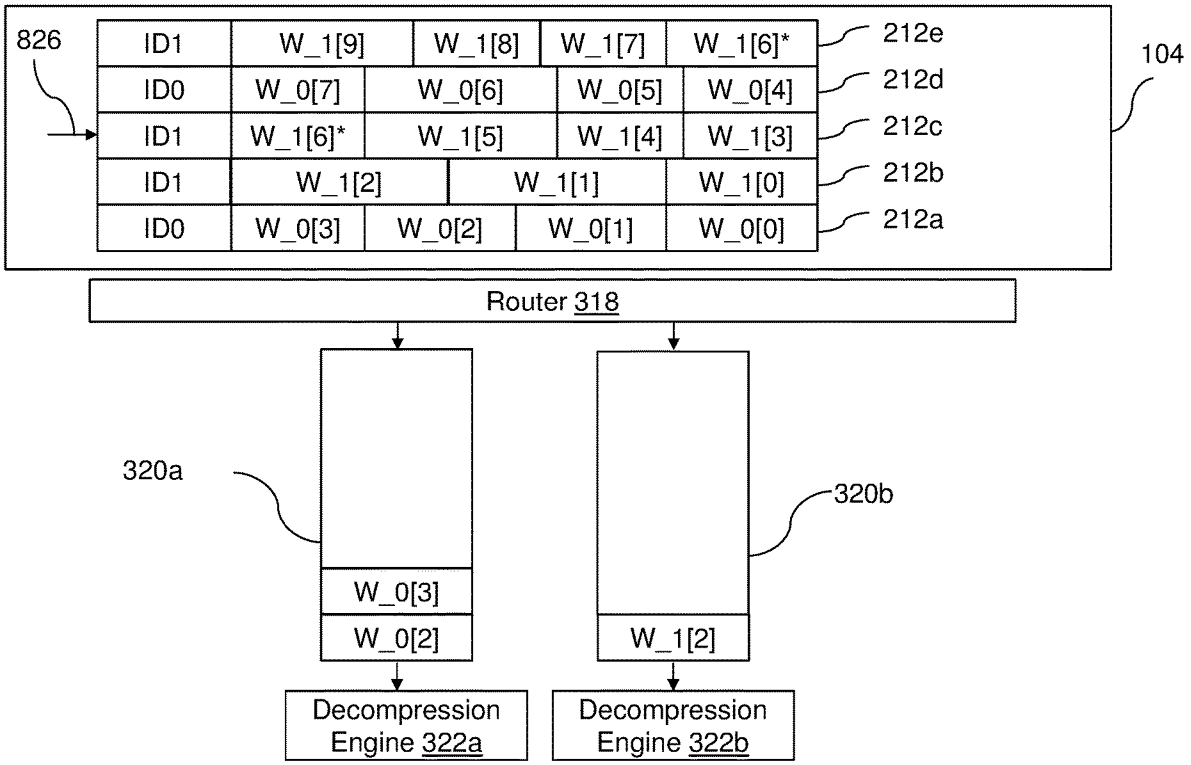
Figure 8F:
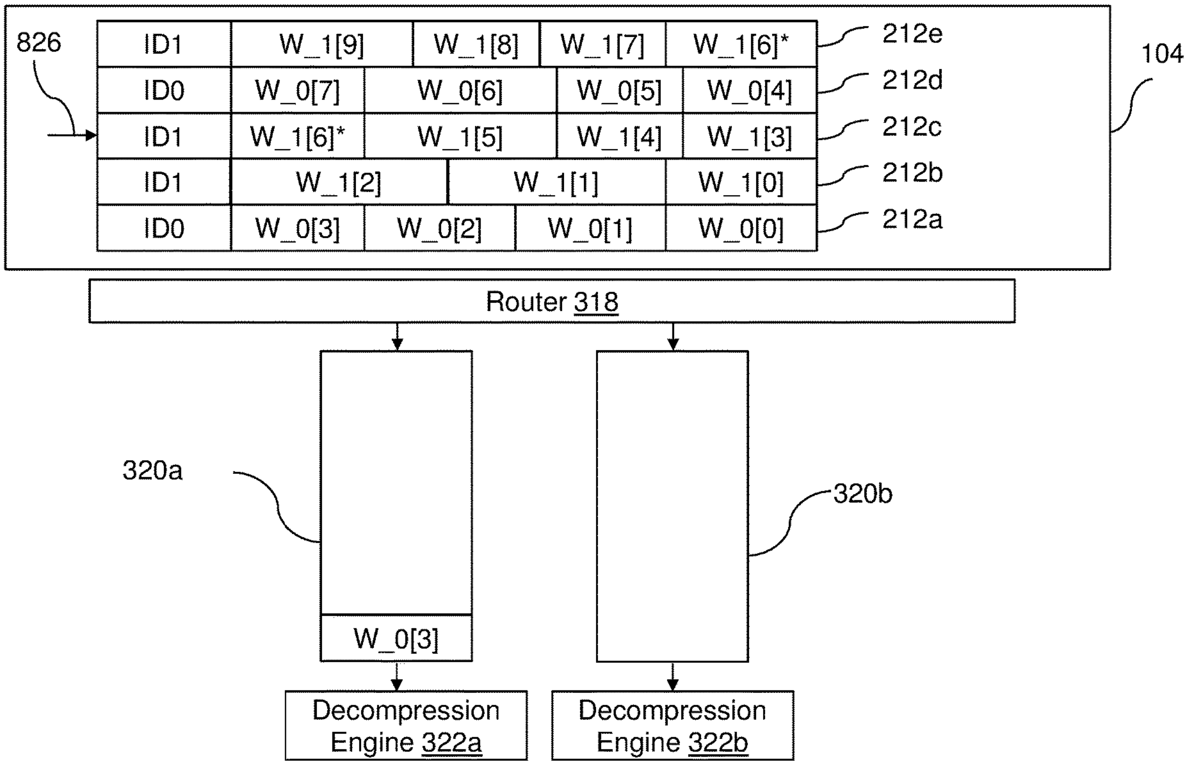

Thus, in FIG. 8C, the router 318 routes the word 212*b* to the queue 320*b* (based on the identifier in the word 212*b*) and increments the memory address counter 826.

The compressed neural network weight at the head of the queue 320*a* (W_0[0]) is valid and the compressed neural network weight at the head of queue 320*b* (W_1[0]) is valid. Thus, in FIG. 8D, the decompression engine 322*a* pops W_0[0] and decompresses it, and the decompression engine 322*b* pops W_1[0] and decompresses it. Similarly, in FIGS. 8E and 8F, the decompression engine 32*a* pops and decompresses W_0[1] and then W_0[2], and the decompression engine 32*a* pops and decompresses W_1[1] and then W_1 [2], as the compressed neural network weights at the heads of the queues 320*a* and 320*b* continue to be valid.

Figure 8G:
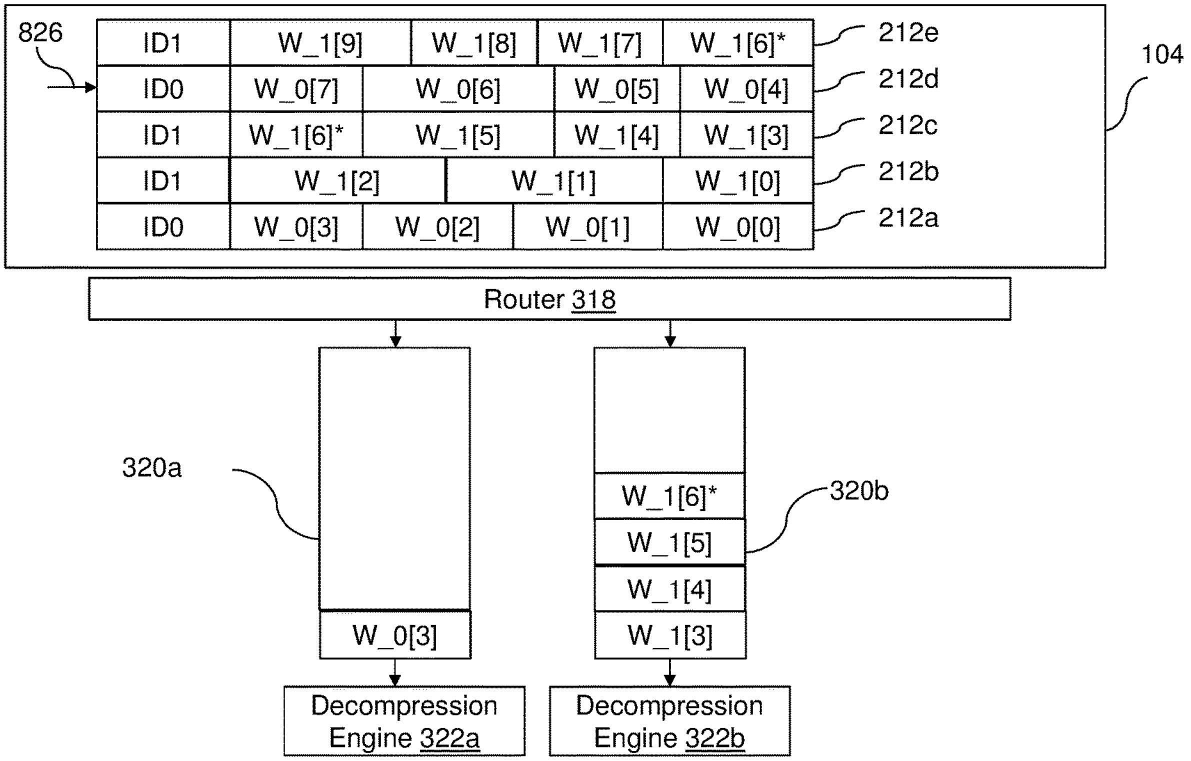
Figure 8H:
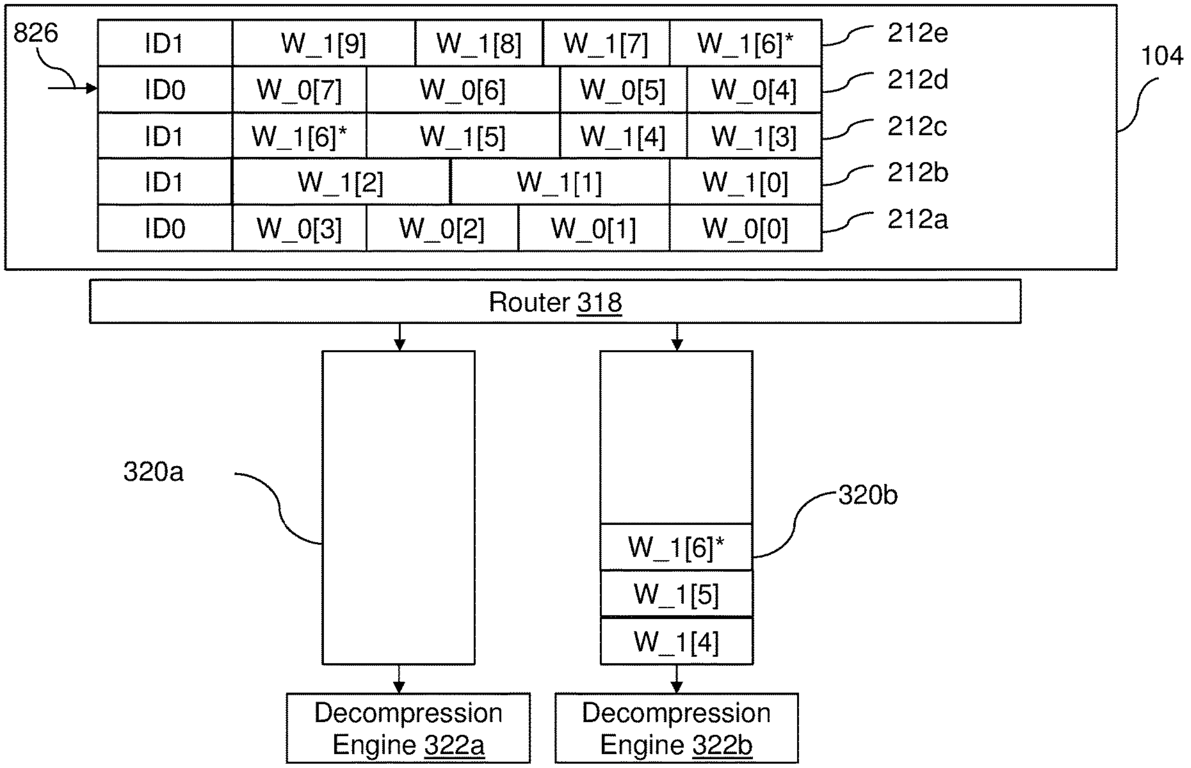

After this, the queue 320*b* is empty, and in FIG. 8G, the router 318 routes the word 212*c* to the queue 320*b* (based on the identifier in the word 212*c*) and increments the memory address counter 826.

The compressed neural network weight at the head of the queue 320*a* (W_0[3]) is valid and the compressed neural network weight at the head of queue 320*b* (W_1[3]) is valid. Thus, in FIG. 8H, the decompression engine 322*a* pops W_0[3] and decompresses it, and the decompression engine 322*b* pops W_1[3] and decompresses it.

Figure 8I:
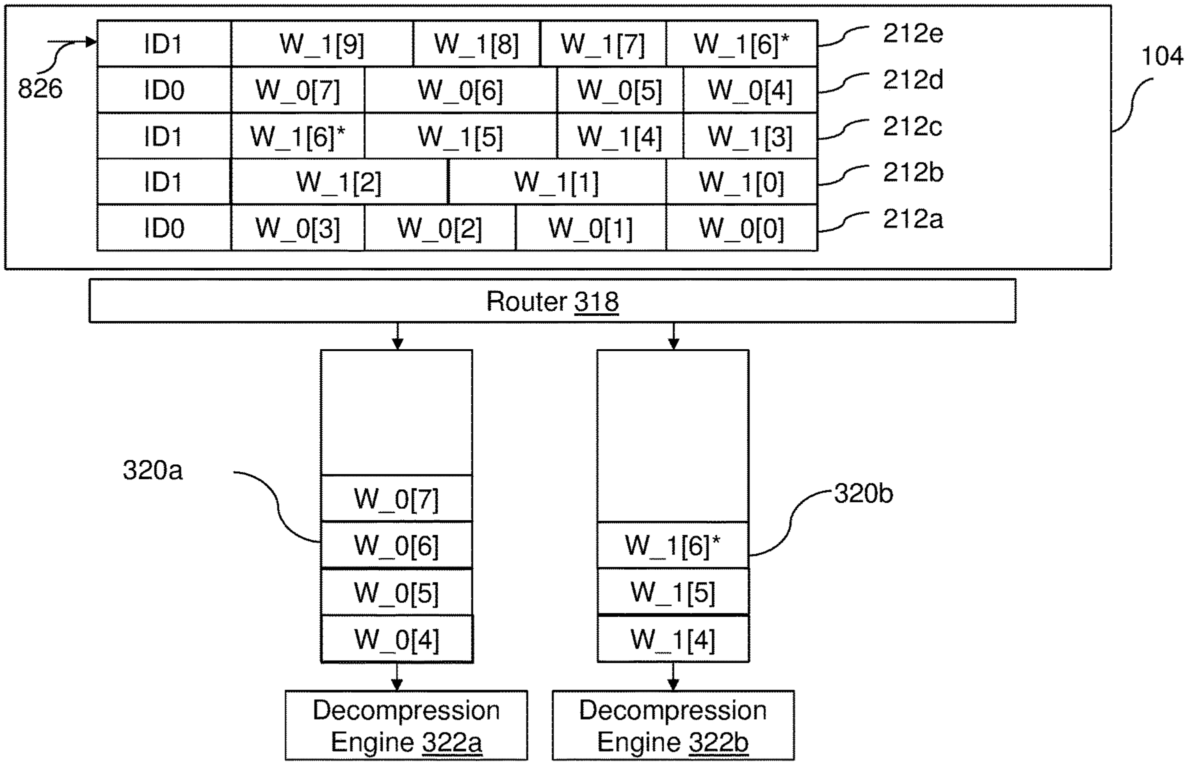
Figure 8J:
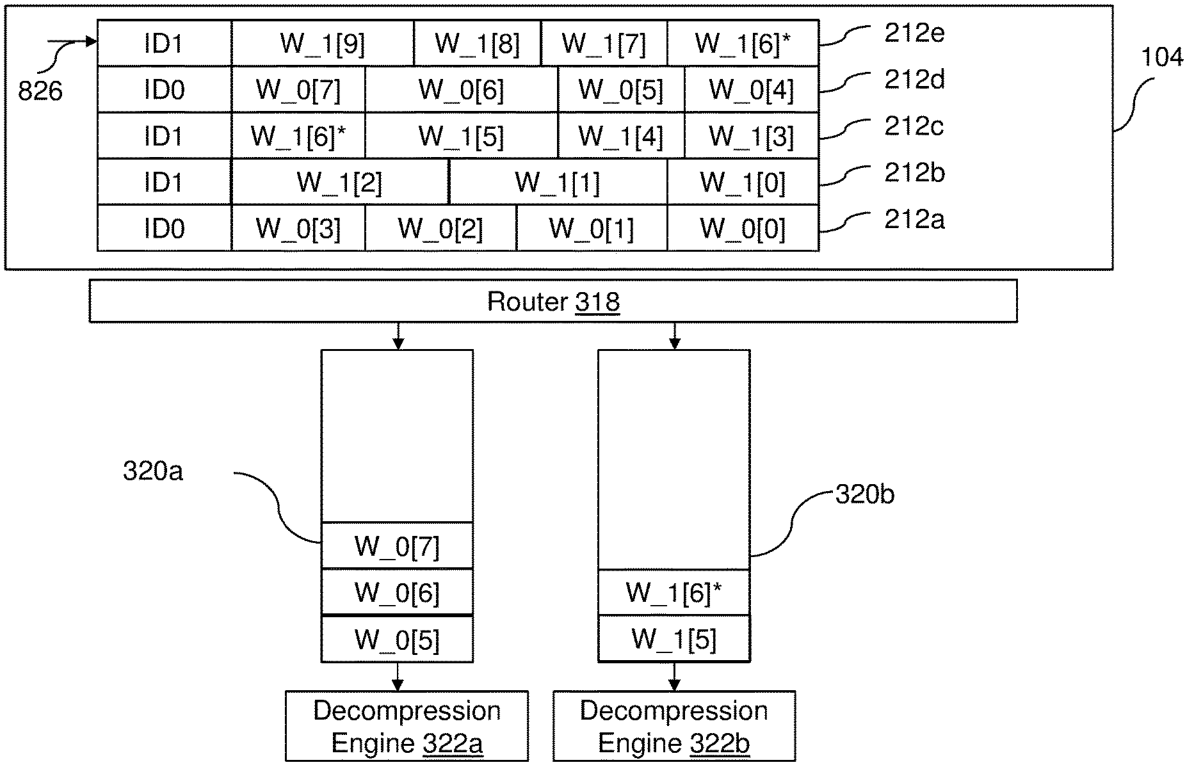
Figure 8K:
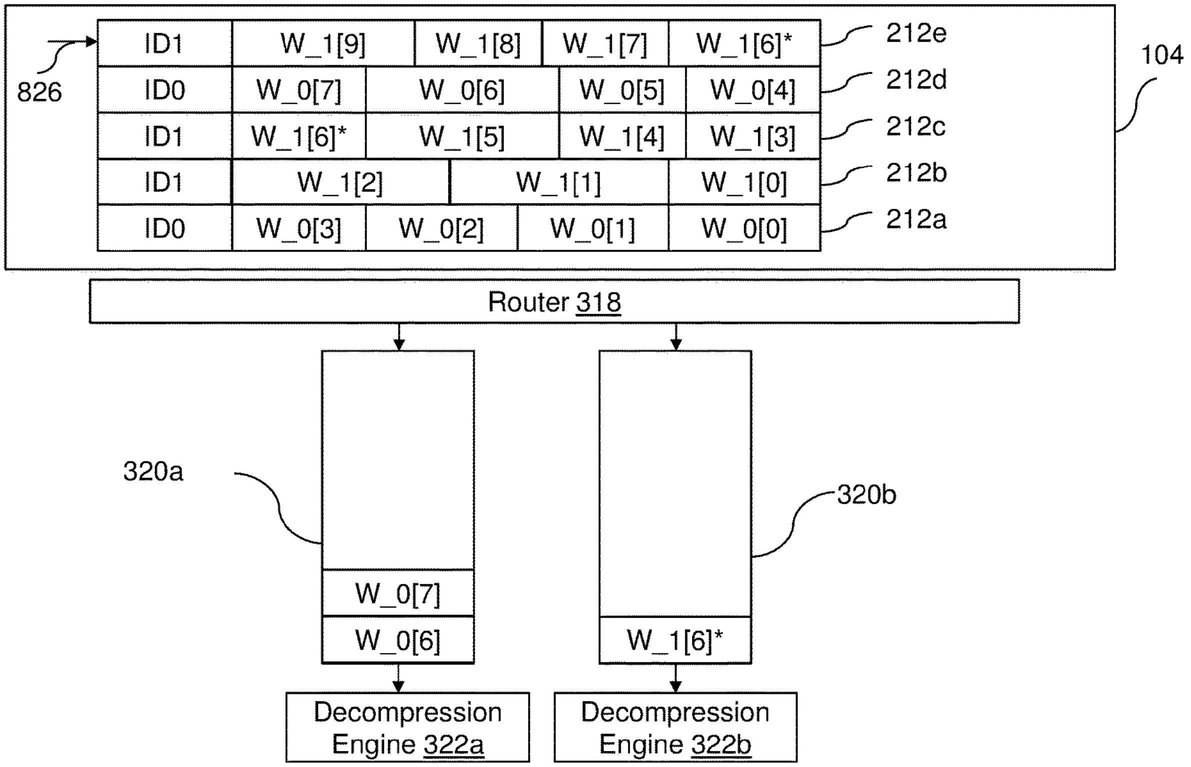
Figure 8L:
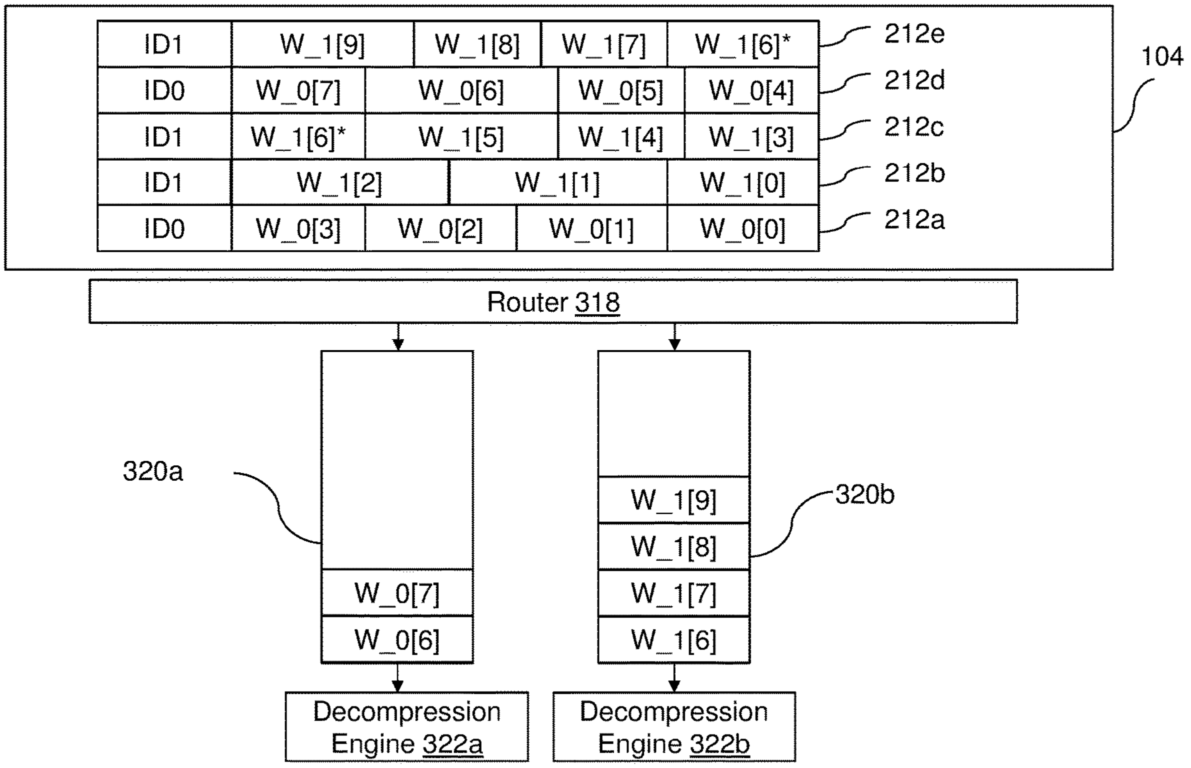

After this, the queue 320*a* is empty, and in FIG. 8I, the router 318 routes the word 212*d* to the queue 320*a* (based on the identifier in the word 212*d*) and increments the memory address counter 826.

The compressed neural network weight at the head of the queue 320*a* (W_0[4]) is valid and the compressed neural network weight at the head of queue 320*b* (W_1[4]) is valid. Thus, in FIG. 8J, the decompression engine 322*a* pops W_0[4] and decompresses it, and the decompression engine 322*b* pops W_1[4] and decompresses it. Similarly, in FIG. 8K the decompression engine 32*a* pops and decompresses W_0[5] and the decompression engine 32*a* pops and decompresses W_1[5], as the compressed neural network weight at the head of queues 320*a* and 320*b* continue to be valid.

Figure 8M:
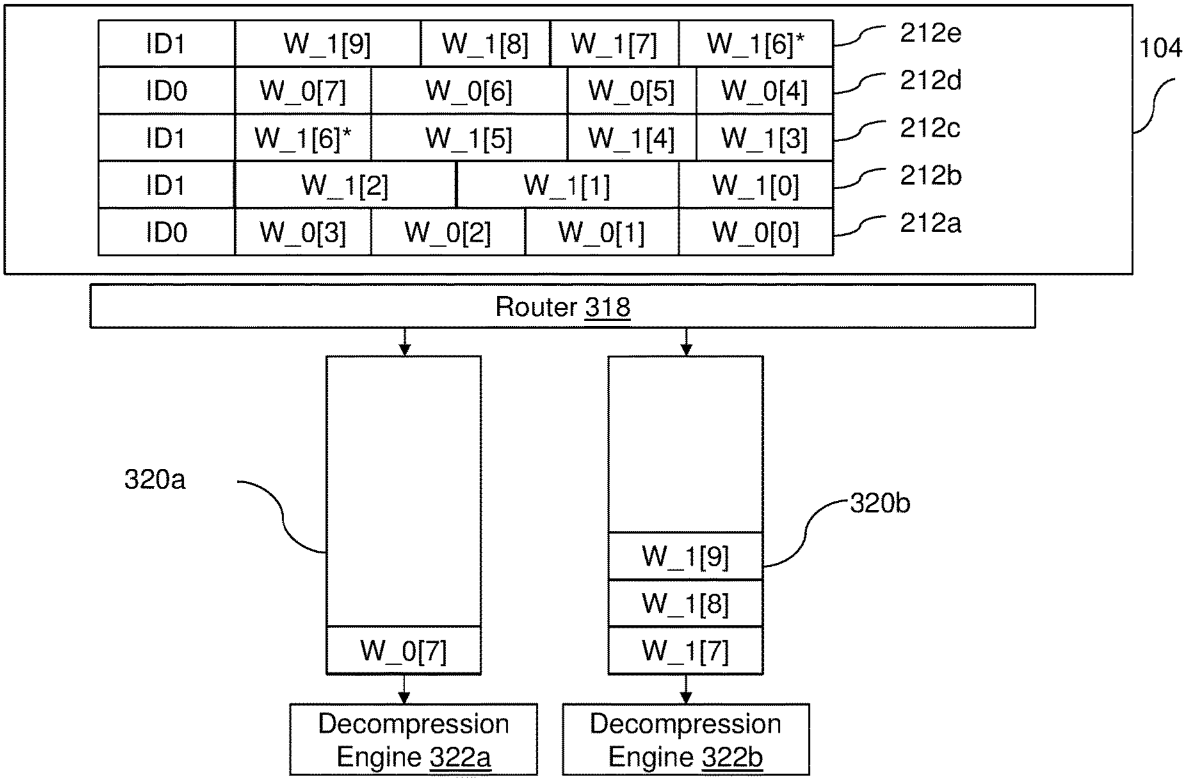

After this, the compressed neural network weight at the head of the queue 320*b*, namely W_1[6]*, is a partial weight and therefore invalid. Thus, in FIG. 8L, the router 318 routes the word 212*e* to the queue 320*b* (based on the identifier in the word 212*e*) and increments the memory address counter 826 (no longer illustrated). The word 212*e* contains the remaining bits of the weight W_1[6], and thus reading the word 212*e* into the queue 30*b* completes the weight W_1[6] at the head of the queue 320*b* such that the compressed neural network weight at the head the queue 320*a* (W_0[6]) is valid and the compressed neural network weight at the head of queue 320*b* (W_1[6]) is valid. In FIG. 8M, popping and decompressing of the weights W_0[6] and W_1[6] proceeds.

As described above, the neural network chip 100 and the methods described above may be implemented in an car-worn device, such as hearing aid, cochlear implant, or earphone. However, the neural network chip 100 and the methods described above may also be used in other applications.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

The invention claimed is:

1. A neural network chip comprising:

a weight memory;

routing and decompression circuitry comprising:

- a router coupled to the weight memory;
- multiple queues coupled to the router; and
- multiple decompression engines; and processing circuitry comprising multiple multiply-and-accumulate circuits (MACs);

wherein:

- each respective decompression engine of the multiple decompression engines is coupled between a respective queue of the multiple queues and a respective MAC of the multiple MACs;
- the weight memory is configured to store multiple words, each word of the multiple words comprising:
  - a weight field configured to store multiple compressed neural network weights comprising all bits of M compressed neural network weights and some but not all bits of an (M+1)th compressed neural network weight; and
  - an identifier field configured to store an identifier;

the router is configured to route a word of the multiple words from the weight memory to one of the multiple queues based on the identifier in the identifier field of the word; and each respective decompression engine is configured to:

pop a compressed neural network weight at a head of the respective queue from the respective queue when compressed neural network weights at heads of all of the multiple queues are valid; and decompress the compressed neural network weight popped from the respective queue to generate a decompressed neural network weight.

2. The neural network chip of claim 1, wherein the neural network chip comprises multiple tiles, each tile comprising an instance of the weight memory, an instance of the routing and decompression circuitry, and an instance of the processing circuitry.

3. The neural network chip of claim 1, wherein the word of the multiple words comprises a first word, the multiple words comprise a second word, the first word stores some but not all bits of a particular compressed neural network weight, and the second word comprises remaining bits of the particular compressed neural network weight.

4. The neural network chip of claim 3, wherein the first word and the second word are stored non-consecutively in the weight memory.

5. The neural network chip of claim 3, wherein the multiple words comprise a third word, and the third word stores an integer number of compressed neural network weights.

6. The neural network chip of claim 3, wherein the first word and the third word store different numbers of compressed neural network weights.

7. The neural network chip of claim 1, wherein each respective decompression engine is configured to determine whether the compressed neural network weight at the head of the respective queue is valid.

8. The neural network chip of claim 7, wherein:

the compressed neural network weight comprises a prefix indicating how many bits are in the compressed neural network weight; and each respective decompression engine is configured to inspect the prefix and how many bits are in the respective queue to determine whether the compressed neural network weight at the head of the respective queue is valid.

9. The neural network chip of claim 8, wherein:

each respective queue comprises a ready/valid interface, the ready/valid interface comprising a ready signal and a valid signal;

the valid signal for the ready/valid interface of a respective queue is based on whether the respective decompression engine determines that the compressed neural network weight at the head of the respective queue is valid; and the ready signal for the ready/valid interface of the respective queue is based on valid signals from ready/valid interfaces of all of the multiple queues.

10. The neural network chip of claim 9, wherein:

the neural network chip further comprises activation registers storing input activations; and the ready signal for the ready/valid interface of the respective queue is based on the valid signals from the ready/valid interfaces of all of the multiple queues and a valid signal for an element of the input activations.

11. The neural network chip of claim 1, wherein:

if the compressed neural network weights at the heads of all of the multiple queues are not all valid, then each respective decompression engine is configured to wait to pop the compressed neural network weight at the head of the respective queue from the respective queue until one or more further words are read from the weight memory and the compressed neural network weights at the heads of all of the multiple queues are valid.

12. The neural network chip of claim 1, wherein each respective decompression engine is further configured to transmit the decompressed neural network weight to the respective MAC.

13. The neural network chip of claim 12, wherein:

the neural network chip further comprises activation registers storing input activations; and the respective MAC is configured to multiply the decompressed neural network weight by an input activation element received from the activation registers.

14. The neural network chip of claim 13, wherein all of the multiple MACs are configured to use a same input activation element at a given time step.

15. The neural network chip of claim 1, wherein the multiple words are added to the weight memory by:

adding one word containing compressed neural network weights destined for each of the multiple queues to the weight memory;

determining which queue of the multiple queues will run out of compressed neural network weights next; and adding a word containing compressed neural network destined for the queue of the multiple queues that will run out of compressed neural network weights next.

* * * * *